United States Patent
Wexler et al.

(10) Patent No.: US 10,876,050 B2
(45) Date of Patent: Dec. 29, 2020

(54) PROCESS FOR PRODUCING DIESEL FUEL FROM A BIORENEWABLE FEED

(71) Applicant: UOP LLC, Des Plaines, IL (US)

(72) Inventors: James T Wexler, Wheaton, IL (US); Ralph P Davis, Schaumburg, IL (US); Nickolas Kapaun, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/290,225

(22) Filed: Mar. 1, 2019

(65) Prior Publication Data

US 2020/0277531 A1 Sep. 3, 2020

(51) Int. Cl.
| | |
|---|---|
| *C10G 3/00* | (2006.01) |
| *C10G 45/02* | (2006.01) |
| *C10G 45/72* | (2006.01) |
| *C10G 65/02* | (2006.01) |
| *C10G 67/02* | (2006.01) |
| *C10L 1/08* | (2006.01) |
| *C10G 65/04* | (2006.01) |

(52) U.S. Cl.
CPC ............... *C10G 3/50* (2013.01); *C10G 3/54* (2013.01); *C10G 3/60* (2013.01); *C10G 45/02* (2013.01); *C10G 45/72* (2013.01); *C10G 65/02* (2013.01); *C10G 65/04* (2013.01); *C10G 67/02* (2013.01); *C10L 1/08* (2013.01); *C10G 2300/1014* (2013.01); *C10G 2300/1018* (2013.01); *C10G 2300/202* (2013.01); *C10G 2300/205* (2013.01); *C10G 2300/4006* (2013.01); *C10G 2400/04* (2013.01); *C10G 2400/08* (2013.01); *C10L 2200/0484* (2013.01); *C10L 2270/026* (2013.01); *C10L 2270/04* (2013.01)

(58) Field of Classification Search
None
See application file for complete search history.

(56) References Cited

U.S. PATENT DOCUMENTS

| | | | |
|---|---|---|---|
| 5,264,188 A * | 11/1993 | Lew | C10G 65/04 208/211 |
| 8,026,401 B2 * | 9/2011 | Abhari | C10G 3/46 208/49 |
| 8,575,408 B2 | 11/2013 | Marker et al. | |

(Continued)

FOREIGN PATENT DOCUMENTS

WO WO-2017023838 A1 * 2/2017 ............. C10G 45/58

OTHER PUBLICATIONS

Towler et al., Chemical Engineering Design - Principles, Practice and Economics of Plant and Process Design (2nd Edition)—Chapter 5, Elsevier, 2013, pp. 251-275. (Year: 2013).*

*Primary Examiner* — Philip Y Louie
(74) *Attorney, Agent, or Firm* — Paschall & Associates, LLC; James C. Paschall

(57) ABSTRACT

The process produces a diesel from a biorenewable feedstock by hydrotreating to remove heteroatoms and saturate olefins. The biorenewable feedstock is contacted in a guard bed reactor in the presence of hydrogen to saturate olefins and remove metals to produce a contacted feed stream. The contacted feed stream is then heated in a charge heater to a higher temperature than in the guard bed reactor and hydrotreated in the presence of a hydrotreating hydrogen stream and a hydrotreating catalyst to deoxygenate the contacted feed stream to provide a hydrotreated stream.

20 Claims, 1 Drawing Sheet

(56) References Cited

U.S. PATENT DOCUMENTS

| | | | |
|---|---|---|---|
| 9,845,432 B2 | 12/2017 | Rispoli et al. | |
| 2009/0321311 A1 | 12/2009 | Marker et al. | |
| 2011/0245551 A1* | 10/2011 | Marker | C10G 3/00 |
| | | | 585/240 |
| 2016/0289136 A1* | 10/2016 | Ellig | C10G 45/58 |
| 2018/0148654 A1 | 5/2018 | Wexler et al. | |

* cited by examiner

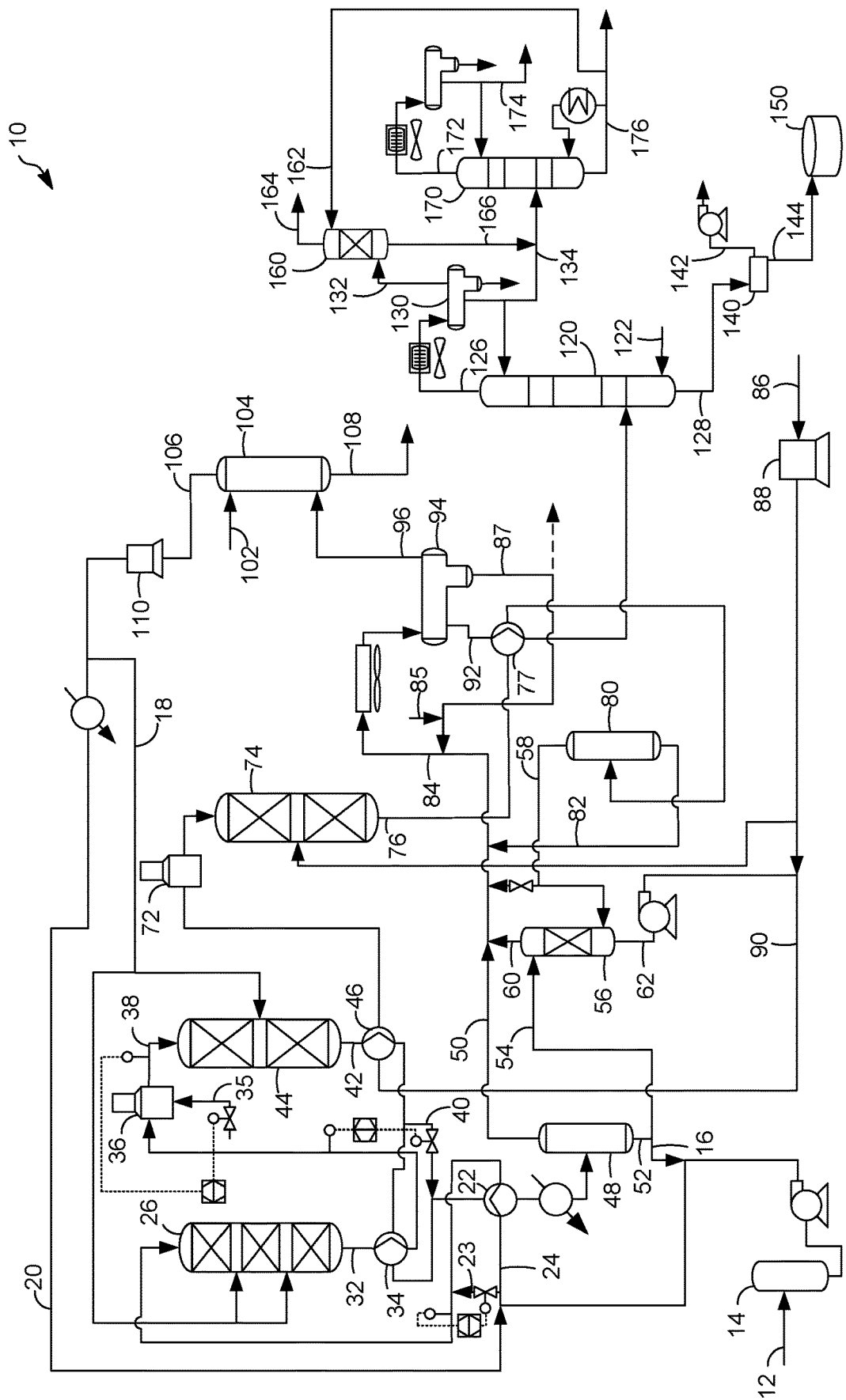

PROCESS FOR PRODUCING DIESEL FUEL FROM A BIORENEWABLE FEED

FIELD

The field is producing hydrocarbons useful as diesel boiling range fuel or aviation range fuel components from biorenewable feedstock such as triglycerides and free fatty acids found in materials such as plant and animal fats and oils.

BACKGROUND

As the demand for fuel increases worldwide, there is increasing interest in producing fuels and blending components from sources other than crude oil. Often referred to as a biorenewable source, these sources include, but are not limited to, plant oils such as corn, rapeseed, canola, soybean, microbial oils such as algal oils, animal fats such as inedible tallow, fish oils and various waste streams such as yellow and brown greases and sewage sludge. A common feature of these sources is that they are composed of glycerides and free fatty acids (FFA). Both triglycerides and the FFAs contain aliphatic carbon chains having from about 8 to about 24 carbon atoms. The aliphatic carbon chains in triglycerides or FFAs can be fully saturated, or mono, di or poly-unsaturated.

Hydroprocessing can include processes which convert hydrocarbons in the presence of hydroprocessing catalyst and hydrogen to more valuable products. Hydrotreating is a process in which hydrogen is contacted with hydrocarbons in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated.

The production of hydrocarbon products in the diesel boiling range can be achieved by hydrotreating a biorenewable feedstock. A biorenewable feedstock can be hydroprocessed by hydrotreating followed by hydroisomerization to improve cold flow properties of product diesel. Hydroisomerization or hydrodewaxing is a hydroprocessing process that increases the alkyl branching on a hydrocarbon backbone in the presence of hydrogen and hydroisomerization catalyst to improve cold flow properties of the hydrocarbon. Hydroisomerization includes hydrodewaxing herein.

Diesel and kerosene production units that process biorenewable feed stocks are typically designed with a guard bed reactor for removing alkali metals and phosphorous by hydrodemetallation and a hydrotreating reactor for deoxygenating and denitrogenating the biorenewable feed stock. Typical feed specifications on nitrogen content have a maximum feedstock nitrogen content of 500 wppm.

It would be desirable to provide a process and apparatus for the production of distillate hydrocarbons from a biorenewable feedstock that have high nitrogen content.

SUMMARY OF THE INVENTION

The process produces a diesel stream from a biorenewable feedstock by hydrotreating to remove heteroatoms and saturate olefins. The biorenewable feedstock is contacted in a guard bed reactor in the presence of hydrogen to saturate olefins and remove metals to produce a contacted feed stream. The contacted feed stream is then heated in a charge heater to a higher temperature than in the guard bed reactor and hydrotreated in the presence of a hydrotreating hydrogen stream and a hydrotreating catalyst to deoxygenate the contacted feed stream to provide a hydrotreated stream.

BRIEF DESCRIPTION OF THE DRAWINGS

The FIGURE is a simplified process flow diagram.

Definitions

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

The term "$C_x$" are to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

DETAILED DESCRIPTION

Refiners would like to be able to process biorenewable feedstocks with higher nitrogen concentrations. A guard bed reactor and a hydrotreating reactor are typically coupled together in biorenewable feed processing. The guard bed reactor and the hydrotreating reactor temperatures are kept low, less than 343° C. (650° F.) for typical biorenewable feedstocks and less than 304° C. (580° F.) for feedstocks with higher free fatty acid (FFA) concentration to avoid polymerization of olefins found in FFA. Polymerization of FFA can plug the guard bed, disrupting processing. Keeping the guard bed and the hydrotreating temperature low prevents adequate processing of high nitrogen feeds because the hydrotreating reactor temperature must be increased to achieve sufficient activity to adequately deoxygenate, denitrogenate and demetallize the biorenewable feed in the presence of the high nitrogen concentration which inhibits catalytic activity particularly toward the end of the run. We propose to decouple the heating of the guard bed reactor and the hydrotreating reactor to enable the hydrotreating reactor to operate in a higher temperature range than the guard bed reactor to enable processing of the high nitrogen feeds.

In an aspect, a combined feed exchanger may be used to heat the combined biorenewable feed stream to the guard bed reactor inlet temperature. Other heating equipment can be used if required, such as a small fired heater, to reach the guard bed reactor inlet temperature. This guard bed temperature is high enough for demetallization to occur, as well as some deoxygenation. The effluent from the guard bed reactor is then heated via either process heat and/or a fired heater to meet the required hydrotreating reactor inlet temperature.

In the FIGURE, in accordance with an exemplary embodiment, a process 10 is shown for processing a biorenewable feedstock. A feed line 12 transports a feed stream of fresh biorenewable feedstock into a feed surge drum 14. The biorenewable feedstock may be blended with a mineral feed stream but preferably comprises a predominance of biorenewable feedstock. A mineral feedstock is a conventional feed derived from crude oil that is extracted from the ground. The biorenewable feedstock may comprise a nitrogen concentration of at least about 300, perhaps about 350, suitably about 400, more suitably about 450, even about 500 wppm and perhaps even about 550 wppm nitrogen and up to about 800 wppm. The biorenewable feedstock may comprise about 1 to about 500 wppm sulfur, typically no more than about 200 wppm sulfur.

A variety of different biorenewable feedstocks may be suitable for the process 10. The term "biorenewable feedstock" is meant to include feedstocks other than those obtained from crude oil. The biorenewable feedstock may include any of those feedstocks which comprise at least one of glycerides and free fatty acids. Most of glycerides will be triglycerides, but monoglycerides and diglycerides may be present and processed as well. Free fatty acids may be obtained from phospholipids which may source phosphorous in the feedstock. Examples of these biorenewable feedstocks include, but are not limited to, camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, fats in milk, fish oil, algal oil, sewage sludge, and the like. Additional examples of biorenewable feedstocks include non-edible vegetable oils from the group comprising Jatropha curcas (Ratanjot, Wild Castor, Jangli Erandi), Madhuca indica (Mohuwa), Pongamia pinnata (Karanji, Honge), calophyllum inophyllum, moringa oleifera and Azadirachta indica (Neem). The triglycerides and FFAs of the typical vegetable or animal fat contain aliphatic hydrocarbon chains in their structure which have about 8 to about 30 carbon atoms. As will be appreciated, the biorenewable feedstock may comprise a mixture of one or more of the foregoing examples. The biorenewable feedstock may be pretreated to remove contaminants and filtered to remove solids.

The biorenewable feed stream in feed line 12 flows from the feed surge drum 14 via a charge pump and mixes with a hot recycle stream in a recycle line 16 and a purified recycle hydrotreating hydrogen stream in a hydrotreating hydrogen line 20 to provide a combined biorenewable feed stream. The recycle to feed rate can be about 2:1 to about 5:1. The combined biorenewable feed stream 12 may be heated in a combined feed exchanger 22 to a guard inlet temperature by heat exchange with a hydrotreated stream in a hydrotreated line 42. The heated combined biorenewable feed stream in a combined feed line 24 is then charged to a guard bed reactor 26 to be partially hydrotreated. The guard inlet temperature may range between about 246° C. (475° F.) and about 304° C. (580° F.) which is low enough to prevent olefins in the FFA from polymerizing but high enough to foster olefin saturation, hydrodemetallation, including phosphorous removal, hydrodeoxygenation, hydrodecarbonylation and hydrodecarboxylation, hydrodesulfurization and hydrodenitrification reactions to occur.

A temperature indicator controller on the combined feed line 24 can measure the guard inlet temperature of the combined biorenewable feed stream and compare it to a set point perhaps in a processor or computer. If the guard inlet temperature of the combined biorenewable feed stream is higher than the set point, a transmitter associated with the computer can transmit a signal to a control valve on a combined exchange bypass line 23 to bypass some or all of the combined biorenewable feed stream around the combined feed exchanger 22 to reduce the guard inlet temperature of the combined biorenewable feed stream entering the guard bed reactor 26. If the guard inlet temperature of the combined biorenewable feed stream entering the guard bed reactor 26 becomes lower than the set point, a signal can be sent to the control valve on the combined exchange bypass line 23 to bypass less or none of the combined biorenewable feed stream around the combined feed exchanger 22.

The guard bed can comprise a base metal on a support. Base metals useable in this process include nickel, chromium, molybdenum and tungsten. Other base metals that can be used include tin, indium, germanium, lead, cobalt, gallium and zinc. The process can also use a metal sulfide, wherein the metal in the metal sulfide is selected from one or more of the base metals listed. The diluted biorenewable feedstock can be charged through these base metal or non-noble catalysts at pressures from 1379 kPa (abs) (200 psia) to 6895 kPa (abs) (1000 psia). In a further embodiment, the guard bed catalyst can comprise a second metal, wherein the second metal includes one or more of the metals: tin, indium, ruthenium, rhodium, rhenium, osmium, iridium, germanium, lead, cobalt, gallium, zinc and thallium. A nickel molybdenum on alumina catalyst may be a suitable catalyst in the guard bed reactor 26. Multiple guard beds may be contained in the guard bed reactor 26 such as 2, 3 or more and a hydrogen quench from a hydrogen quench manifold 18 may be injected at interbed locations to control temperature exotherms.

A contacted biorenewable feed stream is discharged from the guard bed reactor 26 in contacted feed line 32 at a guard outlet temperature that is greater than the guard inlet temperature due to the predominant exothermic reactions that occur in the guard bed reactor 26. The guard outlet temperature may range between about 288° C. (550° F.) and about 343° C. (650° F.). These guard outlet temperature ranges are low enough to prevent olefins in the FFA from polymerizing but high enough to foster olefin saturation, hydrodemetallation, including phosphorous removal, hydrodeoxygenation, hydrodecarbonylation and hydrodecarboxylation, hydrodesulfurization and hydrodenitrification reactions to occur. In the guard bed reactor 26, most of the demetallation and deoxygenation, including carbonylation and carboxylation, reactions will occur with some denitrogenation and desulfurization occurring. Metals removed include alkali metals and alkali earth metals and phosphorous.

The guard outlet temperature of the contacted biorenewable feed stream in the contacted feed line 32 may be of insufficient temperature to sufficiently hydrodemetallate, hydrodeoxygenate, hydrodecarbonylate, hydrodecarboxylate, hydrodenitrogenate and hydrodesulfurize the contacted biorenewable feed stream in a hydrotreating reactor 44. Hence, the contacted biorenewable feed stream may be heated in a guard bed discharge heat exchanger 34 by heat exchange with a hydrotreated stream in the hydrotreated line 42 to increase the temperature of the contacted biorenewable feed stream to an intermediate temperature greater than or equal to the guard outlet temperature and less than or equal to a hydrotreating inlet temperature. Moreover, the contacted biorenewable feed stream may be further heated in a charge heater 36 which may be a fired heater to increase the temperature of the contacted biorenewable feed stream from the intermediate temperature or completely heated in the charge heater 36 from the guard outlet temperature completely to the hydrotreating inlet temperature that is greater than the guard outlet temperature to provide a heated, contacted biorenewable feed stream. The charge heater 36 is located between an outlet of the guard bed reactor 26 and an inlet to the hydrotreating reactor 44. In other words, the charge heater 36 is located both downstream of the guard bed reactor 26 and upstream of the hydrotreating reactor 44.

A temperature indicator controller may be used to control the intermediate temperature of the contacted biorenewable feed stream exiting the guard bed discharge heat exchanger 34 upstream of the charge heater 36. A temperature indicator controller on the contacted feed line 32 can measure the intermediate temperature of the heated, contacted biorenewable feed stream between the discharge heat exchanger 34 and the charge heater 36 and compare it to a set point perhaps in a processor or computer. If the intermediate temperature of the heated, contacted biorenewable feed stream is higher than the set point, a transmitter associated with the computer can transmit a signal to a control valve on a heat exchange bypass line 40 to bypass some or all of the hydrotreated stream in the hydrotreated line 42 around the guard bed discharge heat exchanger 34 to reduce the intermediate temperature of the contacted biorenewable feed stream entering the charge heater 36. If the intermediate temperature of the contacted biorenewable feed stream entering the charge heater 36 becomes lower than the set point, a signal can be sent to the control valve on the heat exchange bypass line 40 to bypass less or none of the hydrotreated feed stream in the hydrotreated line 42 around the guard bed discharge heat exchanger 34.

A temperature indicator controller may be used to adjust the feed rate of fuel oil or gas fed to the charge heater 36. A temperature indicator controller on hydrotreater feed inlet line 38 can measure the temperature of the heated, contacted biorenewable feed stream and compare it to a set point perhaps in a processor or computer. If the hydrotreating inlet temperature of the heated, contacted biorenewable feed stream is higher than the set point the transmitter associated with the computer can transmit a signal to a control valve on a fuel line 35 to the charge heater 36 to reduce the flow rate of fuel oil or gas to the charge heater 36 to reduce the hydrotreating inlet temperature. If the hydrotreating inlet temperature of the heated, contacted biorenewable feed stream is lower than the set point, the transmitter associated with the computer can transmit a signal to the control valve on the fuel line 35 to the charge heater 36 to increase the flow rate of fuel oil or gas to the charge heater 36 to increase the hydrotreating inlet temperature. Other variations of the heating control mechanism are envisioned.

The heated, contacted biorenewable feed stream is charged to a hydrotreating reactor 44 at a hydrotreating inlet temperature. The hydrotreating inlet temperature may range from between about 343° C. (650° F.) and about 400° C. (752° F.) and preferably between about 349° C. (690° F.) and about 390° C. (734° F.).

In the hydrotreating reactor 44, the heated, contacted biorenewable feed stream is contacted with a hydrotreating catalyst in the presence of hydrogen at hydrotreating conditions to saturate the olefinic or unsaturated portions of the n-paraffinic chains in the biorenewable feedstock. The hydrotreating catalyst also catalyzes hydrodeoxygenation reactions including decarboxylation and carbonylation reactions to remove oxygenate functional groups from the biorenewable feedstock molecules which are converted to water and carbon oxides. The hydrotreating catalyst also catalyzes desulfurization of organic sulfur and denitrogenation of organic nitrogen in the biorenewable feedstock. Essentially, the hydrotreating reaction removes heteroatoms from the hydrocarbons and saturates olefins in the feed stream.

The hydrotreating catalyst may be provided in one, two or more beds and employ interbed hydrogen quench streams from the hydrogen quench stream from a hydrogen quench line 18.

The hydrotreating catalyst may comprise nickel, nickel/molybdenum, or cobalt/molybdenum dispersed on a high surface area support such as alumina. Other catalysts include one or more noble metals dispersed on a high surface area support. Non-limiting examples of noble metals include platinum and/or palladium dispersed on an alumina support such as gamma-alumina. Suitable hydrotreating catalysts include BDO 200 or BDO 300 available from UOP LLC in Des Plaines, Ill. Generally, hydrotreating conditions include a pressure of about 700 kPa (100 psig) to about 21 MPa (3000 psig). The hydrotreating outlet temperature may range between about 343° C. (650° F.) and about 427° C. (800° F.) and preferably between about 349° C. (690° F.) and about 400° C. (800° F.). Two hydrotreating catalyst beds are shown in the FIGURE, but one or more are contemplated.

A hydrotreated stream is produced in a hydrotreated line 42 from the hydrotreating reactor 44 comprising a hydrocarbon fraction which has a substantial n-paraffin concentration. Oxygenate concentration in the hydrocarbon fraction is essentially nil, whereas the olefin concentration is substantially reduced relative to the contacted biorenewable feed stream. The organic sulfur concentration in the hydrocarbon fraction is no more than 500 wppm and the organic nitrogen concentration in the hydrocarbon fraction is less than 10 wppm. Although this hydrocarbon fraction is useful as a diesel fuel, because it comprises a substantial concentration of n-paraffins from the biorenewable feedstock, it will have poor cold flow properties. The hydrotreated stream can be contacted with an isomerization catalyst under isomerization conditions to at least partially isomerize the n-paraffins to isoparaffins, as hereinafter described in a separate isomerization reactor 74.

The hydrotreated stream in the hydrotreated effluent line 42 may first flow to the combined isomerization feed exchanger 46 to heat the isomerization feed stream in the hydroisomerization feed line 90 and cool the hydrotreated stream. As previously described, the cooled hydrotreated stream in the hydrotreated line 42 may then be heat exchanged with the contacted biorenewable feed stream in the guard bed discharge heat exchanger 34 to cool the hydrotreated stream in the hydrotreated line 42 and heat the contacted, biorenewable feed stream to the intermediate temperature. The twice cooled hydrotreated steam in the hydrotreated line 42 may be then further cooled in the combined feed exchanger 22 by heat exchange with combined biorenewable feed stream in the combined feed line 24 to heat the combined biorenewable feed stream to the guard inlet temperature and cool the hydrotreated stream in the hydrotreated line 42. The thrice cooled hydrotreated stream may be even further cooled, perhaps to make steam, before it is separated to provide a hydrotreated vapor stream and a hydrotreated liquid stream having less oxygen concentration than the biorenewable feed stream.

The hydrotreated stream may be separated in a hydrotreating separator 48 to provide a hydrocarbonaceous, hot vapor stream in a hot overhead line 50 and a hydrocarbonaceous, hot liquid stream in a hot bottoms line 52. The hot separator 48 may be in downstream communication with the hydrotreating reactor 44. The hot separator 48 operates at about 177° C. (350° F.) to about 371° C. (700° F.) and preferably operates at about 232° C. (450° F.) to about 315° C. (600° F.). The hot separator 34 may be operated at a slightly lower pressure than the hydrotreating reactor 44 accounting for pressure drop through intervening equipment. The hot separator 48 may be operated at pressures between about 3.4 MPa (gauge) (493 psig) and about 20.4 MPa (gauge) (2959 psig). The hot vapor stream in the hot overhead line 50 may have a temperature of the operating temperature of the hot separator 48.

The hot liquid stream in the hot bottoms line 52 may be split into two streams: a process liquid stream in a process line 54 taken from the hot liquid stream in the hot bottoms line 52 and the recycle liquid stream in the recycle line 16 also taken from the hot liquid stream in the hot bottoms line 52. The recycle liquid stream in the recycle line 16 may be combined with the biorenewable feed stream in line 12 as previously described.

The process liquid stream taken from the hot liquid stream in the process line 54 may be further separated in a hydrotreating separator 56 which may comprise an enhanced hot separator (EHS) with the aid of a stripping gas fed from an isomerization vapor line 58. The process liquid stream is separated to provide a hydrotreated vapor stream and a hydrotreated liquid stream. The hydrotreating separator 56 may be a high pressure stripping column. In the hydrotreating separator 56, the hot process liquid stream from process line 54 flows down through the column where it is partially stripped of hydrogen, carbon dioxide, carbon monoxide, water vapor, propane, hydrogen sulfide, and phosphine, which are potential isomerization catalyst poisons, by stripping gas from the isomerization vapor line 58. The stripping gas may comprise makeup hydrogen gas which has passed through the isomerization reactor 74 and an isomerization separator 80 as hereinafter described.

The stripping gas in the isomerization vapor line 58 enters the enhanced hot separator below the inlet for the hydrotreated process liquid stream in the process liquid line 54. The hydrotreating separator 56 may include internals such as trays or packing located between the inlet for the hydrotreated process liquid stream in the process liquid line 54 and the inlet for the vapor hydroisomerized stream in the isomerization vapor line 58 to facilitate stripping of the liquid phase. The stripped gases and stripping gas exit in a hydrotreated vapor stream in a hydrotreated overhead line 60 extending from a top of the hydrotreating separator 56 and mix with the hot vapor stream in the hot overhead line 50 and an isomerization liquid stream in an isomerization bottoms line 82 and optionally a cold aqueous stream in a cold aqueous line 87 from a cold separator boot to provide a cold separator feed stream in a cold feed line 84.

The hydrotreated liquid stream which may have been stripped collects in the bottom of the hydrotreating separator 56 and flows in a hydrotreated bottoms line 62 to the suction side of a bottoms pump. The hydrotreated liquid stream comprises predominantly diesel range material, with a high paraffinic concentration due to the composition of the biorenewable feedstock.

While a desired product, such as a transportation fuel, may be provided in the hydrotreated bottoms line 62 because the hot liquid stream comprises a higher concentration of normal paraffins, it will possess poor cold flow properties. Accordingly, to improve the cold flow properties, the hydrotreated liquid stream may be contacted with a hydroisomerization catalyst in a hydroisomerization reactor 74 under hydroisomerization conditions to hydroisomerize the normal paraffins to branched paraffins.

The hydrotreated liquid stream may be hydroisomerized over hydroisomerization catalyst in the presence of a hydroisomerization hydrogen stream. Make-up hydrogen gas in make-up line 86 may be compressed in a make-up gas compressor 88 and mixed with the hydrotreated liquid stream pumped from the hydrotreated bottoms line 62 to provide a combined hydroisomerization feed stream in a hydroisomerization feed line 90. The combined hydroisomerization feed stream in the hydroisomerization feed line 90 may be heated in a combined isomerization feed exchanger 46 by heat exchange with the hydrotreated stream in the hydrotreated line 42 and heated in a hydroisomerization charge heater 72 to bring the combined hydroisomerization feed stream to isomerization temperature before charging the hydroisomerization reactor 74.

The hydroisomerization, including hydrodewaxing, of the normal hydrocarbons in the hydroisomerization reactor 74 can be accomplished over one or more beds of hydroisomerization catalyst, and the hydroisomerization may be operated in a co-current mode of operation. Fixed bed, trickle bed down-flow or fixed bed liquid filled up-flow modes are both suitable. A make-up hydrogen quench stream taken from the make-up line 86 may be provided for interbed quench to the hydroisomerization reactor 74.

Suitable hydroisomerization catalysts may comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MgAPSO-11, MgAPSO-31, MgAPSO-41, MgAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal, Me, is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759. The hydroisomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled S. J. Miller, "New Molecular Sieve Process for Lube Dewaxing by Wax Isomerization," 2 Microporous Materials 439-449 (1994). U.S. Pat. Nos. 5,444,032 and 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al—BOR—B) in which the molar $SiO_2$:$Al_2O_3$ ratio is higher than 300:1; (b) one or more metal(s) belonging to Group VIIIA, selected from platinum and palladium, in an amount comprised within the range of from 0.05 to 5% by weight. V. Calemma et al., App. Catal. A: Gen., 190 (2000), 207 teaches yet another suitable catalyst. DI-100 available from UOP LLC in Des Plaines, Ill. may be a suitable catalyst.

Hydroisomerization conditions generally include a temperature of about 150° C. (302° F.) to about 450° C. (842° F.) and a pressure of about 1724 kPa (abs) (250 psia) to about 13.8 MPa (abs) (2000 psia). In another embodiment, the hydroisomerization conditions include a temperature of about 300° C. (572° F.) to about 360° C. (680° F.) and a pressure of about 3102 kPa (abs) (450 psia) to about 6895 kPa (abs) (1000 psia).

A hydroisomerized stream in a hydroisomerized line 76 from the isomerization reactor 74 is a branched-paraffin-rich stream. By the term "rich" it is meant that the effluent stream has a greater concentration of branched paraffins than the stream entering the isomerization reactor 74, and preferably comprises greater than 50 mass-% branched paraffins of the total paraffin content. It is envisioned that the hydroisomerized effluent may contain 70, 80, or 90 mass-% branched paraffins of the total paraffin content. Only minimal branching is required, enough to improve the cold-flow properties of the hydrotreated hot liquid stream to meet specifications. Hydroisomerization conditions are selected to avoid undesirable cracking, so the predominant product in the hydroisomerized stream in the hydroisomerized line 76 is a mono-branched paraffin.

The hydroisomerized stream in the hydroisomerized line 76 from the isomerization reactor 74 flows to an isomerate exchanger 77 to be heat exchanged with a cold liquid stream in cold bottoms line 92 to cool it before entering the hydroisomerization separator 80 for separation into a liquid hydroisomerized stream and vapor hydroisomerized stream. The vapor hydroisomerized stream in a hydroisomerized overhead line 58 extending from an overhead of hydroisomerization separator 80 flows to the hydrotreating separator 56 and may serve as the stripping gas in the hydrotreating separator. A portion of the vapor hydroisomerized stream may optionally bypass the hydrotreating separator 56 and enter the cold feed line 84 through a control valve.

The liquid hydroisomerized stream in the hydroisomerization bottoms line 82 extending from a bottom of the hydroisomerization separator 80 comprising a diesel fuel may be sent directly to a stripping column 120 for producing co-products without condensing and cooling of the diesel fuel. The diesel fuel from the hydroisomerization separator 80 may be further separated in a cold separator 94 along with the hot vapor stream in the hot overhead line 50 and the hydrotreated vapor stream in the hydrotreated overhead line 60 all combined in a cold separator stream in the cold separator feed line 84. The cold separator stream may be mixed with the aqueous stream in the cold aqueous line 87 from the boot of the cold separator 94, be cooled and fed to the cold separator 94.

In the cold separator 94, vaporous components in the hydroisomerized liquid stream will separate and ascend with the hydrotreated vapor stream and the hot vapor stream to provide a cold vapor stream in a cold overhead line 96. The cold vapor stream in the cold overhead line 96 may be passed through a trayed or packed recycle scrubbing column 104 where it is scrubbed by means of a scrubbing liquid such as an aqueous solution fed by scrubbing liquid line 102 to remove acid gases including hydrogen sulfide and carbon dioxide by extracting them into the aqueous solution. Preferred scrubbing liquids include Selexol™ available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other scrubbing liquids can be used in place of or in addition to the preferred amines. The lean scrubbing liquid contacts the cold vapor stream and absorbs acid gas contaminants such as hydrogen sulfide and carbon dioxide. The resultant "sweetened" cold vapor stream is taken out from an overhead outlet of the recycle scrubber column 104 in a recycle scrubber overhead line 106, and a rich scrubbing liquid is taken out from the bottoms at a bottom outlet of the recycle scrubber column 104 in a recycle scrubber bottoms line 108. The spent scrubbing liquid from the bottoms may be regenerated and recycled back to the recycle scrubbing column 104 in the scrubbing liquid line 102. The scrubbed hydrogen-rich stream emerges from the scrubber via the recycle scrubber overhead line 106 and may be compressed in a recycle compressor 110.

The compressed hydrogen stream in the scrubber overhead line 106 supplies hydrogen to the hydrotreating hydrogen stream in the hydrotreating hydrogen line 20 and interbed quench streams from a quench line 18 in the guard bed reactor 26 and a hydrotreating reactor 44.

The recycle scrubbing column 104 may be operated with a gas inlet temperature between about 38° C. (100° F.) and about 66° C. (150° F.) and an overhead pressure of about 3 MPa (gauge) (435 psig) to about 20 MPa (gauge) (2900 psig). Suitably, the recycle scrubbing column 104 may be operated at a temperature of about 40° C. (104° F.) to about 125° C. (257° F.) and a pressure of about 1200 to about 1600 kPa. The temperature of the hot vapor stream to the recycle scrubbing column 104 may be between about 20° C. (68° F.) and about 80° C. (176° F.) and the temperature of the scrubbing liquid stream in the scrubbing liquid line 102 may be between about 20° C. (68° F.) and about 70° C. (158° F.).

The cold liquid stream in cold bottoms line 92 comprises hydrocarbons useful as diesel boiling range fuel as well as other hydrocarbons such as propane, naphtha and aviation fuel. Accordingly, they may be stripped in a stripping column 120. The cold liquid stream in the cold bottoms line 92 may be heated by heat exchange in the isomerate exchanger 77 with a hydroisomerized stream in the hydroisomerized line 76 to heat the cold liquid stream and fed to the stripping column 120 from an inlet which may be in a bottom half of the column. The stripping column 120 may be reboiled by heat exchange with a suitable hot stream or in a fired heater to provide the necessary stripping vapor (not shown). Alternately, a stripping media which is an inert gas such as steam from a stripping media line 122 may be used to heat the column, but the stripped product may require drying to meet product water specifications. The stripping column 120 provides an overhead stripper gaseous stream of naphtha, LPG, hydrogen, hydrogen sulfide, steam and other gases in an overhead line 126 and a stripped liquid stream in a stripper bottoms line 128. The cold overhead stripper gaseous stream may be condensed and separated in a receiver 130. A net stripper overhead line 132 from the receiver 130 may carry a net stripper gaseous stream to a sponge absorber for LPG recovery. Unstabilized liquid naphtha from the bottoms of the receiver 130 may be split between a reflux portion refluxed to the top of the cold stripping column 120 and a stripper liquid overhead stream which may be transported a debutanizer column for naphtha and LPG recovery in a stripper receiver bottoms line 134. A sour water stream may be collected from a boot of the overhead receiver 130.

The stripping column 120 may be operated with a bottoms temperature between about 149° C. (300° F.) and about 288° C. (550° F.), preferably no more than about 260° C. (500° F.), and an overhead pressure of about 0.35 MPa (gauge) (50 psig), preferably no less than about 0.70 MPa (gauge) (100 psig), to no more than about 2.0 MPa (gauge) (290 psig). The temperature in the overhead receiver 130 ranges from about 38° C. (100° F.) to about 66° C. (150° F.) and the pressure is essentially the same as in the overhead of the stripping column 120.

The sponge absorber column 160 may receive the net stripper gaseous stream in the net stripper overhead line 132. A lean absorbent stream in a lean absorbent line 162 may be fed into the sponge absorber column 160 through an absorbent inlet. The lean absorbent may comprise a naphtha stream in a lean absorbent line 162 perhaps from a debutanizer bottoms. In the sponge absorber column 160, the lean absorbent stream and the net stripper gaseous stream are counter-currently contacted. The sponge absorbent absorbs LPG hydrocarbons from the net stripper gaseous stream into an absorbent rich stream.

The hydrocarbons absorbed by the sponge absorbent include some methane and ethane and most of the LPG, $C_3$ and $C_4$, hydrocarbons, and any $C_5$ and $C_{6+}$ light naphtha hydrocarbons in the net stripper gaseous stream. The sponge absorber column 160 operates at a temperature of about 34° C. (93° F.) to 60° C. (140° F.) and a pressure essentially the same as or lower than the stripping receiver 130 less frictional losses. A sponge absorption off gas stream depleted of LPG hydrocarbons is withdrawn from a top of the sponge absorber column 160 at an overhead outlet through a sponge absorber overhead line 164. The sponge absorption off gas stream in the sponge absorber overhead line 164 may be transported to a hydrogen recovery unit that is not shown for hydrogen recovery. A rich absorbent stream rich in LPG hydrocarbons is withdrawn in a rich absorber bottoms line 166 from a bottom of the sponge absorber column 160 at a bottoms outlet which may be fed to a debutanizer column 170 via the stripper liquid overhead stream in the stripper receiver bottoms line 134.

In an embodiment, the debutanizer column 170 may fractionate the stripper liquid overhead stream and the rich absorbent stream in the stripper receiver bottoms line 134 into a debutanized bottoms stream comprising predominantly $C_{5+}$ hydrocarbons and a debutanizer overhead stream comprising LPG hydrocarbons. The debutanizer overhead stream in a debutanizer overhead line 172 may be fully condensed with reflux to the debutanizer column 170 and recovery of LPG in a debutanized overhead liquid stream in a net receiver bottoms line 174. The debutanized bottoms stream may be withdrawn from a bottom of the debutanizer column 170 in a debutanized bottoms line 176. A reboil stream taken from a bottom of the debutanizer column 170 or from a debutanized bottoms stream in the debutanizer bottoms line 176 may be boiled up in the reboil line and sent back to the debutanizer column 170 to provide heat to the column. Alternatively, a hot inert media stream such as steam may be fed to the column 170 to provide heat.

The stripped liquid stream in the stripper bottoms line 128 may comprise green diesel boiling range hydrocarbons. Consequently, the liquid stream in stripper bottoms line 128 may be dried and fed to a diesel pool 150. For example, the stripped liquid stream may be dried in a vacuum drier 140 operated below atmospheric pressure. The stripped liquid stream in the stripper bottoms line 128 may be fed to the vacuum drier 140 which may include a vacuum pump in communication with a vent stream 142 which pulls a vacuum on the stripped liquid stream entering the vacuum drier 140 in the stripper bottoms line 128. The water in the stripped liquid stream will be removed in the gas stream 142. A dried green diesel stream with a lower water concentration than in the stripped liquid stream may be removed from the vacuum drier in a drier bottoms line 144 and forwarded to the diesel pool 150.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for hydrotreating a biorenewable feedstock, the process comprising contacting a biorenewable feed stream in a guard bed reactor in the presence of hydrogen to saturate olefins and remove metals to produce a contacted feed stream; heating the contacted feed stream in a charge heater; and hydrotreating the contacted feed stream in the presence of hydrotreating and a hydrotreating catalyst to deoxygenate the contacted feed stream to provide a hydrotreated stream. An embodiment of the invention is one, any or all of prior embodiments in this paragraph up through the first embodiment in this paragraph further comprising heating the biorenewable feed stream by heat exchange with the hydrotreated stream. An embodiment of the invention is one, any or all of prior embodiments in this paragraph up through the first embodiment in this paragraph further comprising measuring the temperature of the contacted biorenewable feed stream exiting the heat exchange, comparing it to a set point and bypassing a portion of the hydrotreated stream around the heat exchange with the contacted biorenewable feed stream to decrease the temperature of the contacted biorenewable feed stream exiting the heat exchange. An embodiment of the invention is one, any or all of prior embodiments in this paragraph up through the first embodiment in this paragraph further comprising charging the guard bed reactor with the biorenewable feed stream at a guard inlet temperature, discharging the contacted feed stream from the guard bed reactor at a guard outlet temperature that is greater than the guard inlet temperature and charging the contacted feed stream to a hydrotreating reactor at a hydrotreating inlet temperature that is greater than the guard outlet temperature. An embodiment of the invention is one, any or all of prior embodiments in this paragraph up through the first embodiment in this paragraph further comprising heating the biorenewable stream in a heater to the guard inlet temperature. An embodiment of the invention is one, any or all of prior embodiments in this paragraph up through the first embodiment in this paragraph further comprising a guard outlet temperature of less than 343° C. (650° F.). An embodiment of the invention is one, any or all of prior embodiments in this paragraph up through the first embodiment in this paragraph further comprising a guard outlet temperature of less than 304° C. (580° F.). An embodiment of the invention is one, any or all of prior embodiments in this paragraph up through the first embodiment in this paragraph wherein the biorenewable feed stream has a nitrogen concentration of greater than 500 wppm. An embodiment of the invention is one, any or all of prior embodiments in this paragraph up through the first embodiment in this paragraph further comprising separating the hydrotreated stream to provide a hydrotreated vapor stream and a hydrotreated liquid stream having less oxygen concentration than the biorenewable feed stream. An embodiment of the invention is one, any or all of prior embodiments in this paragraph up through the first embodiment in this paragraph wherein separating the hydrotreated stream further comprises separating the hydrotreated stream in a hydrotreating separator to provide a hot vapor stream and a hot liquid stream and separating a process liquid stream taken from the hot liquid stream in an enhanced hot separator with the aid of a stripping gas to separate the process liquid stream to provide the hydrotreated vapor stream and a the hydrotreated liquid stream. An embodiment of the invention is one, any or all of prior embodiments in this paragraph up through the first embodiment in this paragraph further comprising taking a recycle liquid stream from the hot liquid stream and mixing the recycle liquid stream with the biorenewable feed stream. An embodiment of the invention is one, any or all of prior embodiments in this paragraph up through the first embodiment in this paragraph further comprising hydroisomerizing the hydrotreated liquid stream over a hydroisomerization catalyst in the presence of a hydroisomerization hydrogen stream to provide a hydroisomerized stream. An embodiment of the invention is one, any or all of prior embodiments in this paragraph up through the first embodiment in this paragraph further comprising separating the hydroisomerized stream to provide a vapor hydroisomerized stream and a liquid hydroisomerized stream. An embodiment of the invention is one, any or all of prior embodiments in this paragraph up through the first embodiment in this paragraph further comprising stripping the process liquid stream with a stripping gas comprising the vapor hydroisomerized stream to provide the hydrotreated vapor stream and the hydrotreated liquid stream. An embodiment of the invention is one, any or all of prior embodiments in this paragraph up through the first embodiment in this paragraph further comprising cooling the hot vapor stream, the vapor hydrotreated stream and the liquid hydroisomerized stream and feeding them to a cold separator which separates a cold liquid stream which is stripped to produce a green diesel stream.

A second embodiment of the invention is a process for hydrotreating a biorenewable feedstock, the process comprising heating a biorenewable feed stream by heat exchange with a hydrotreated stream to a guard inlet temperature; contacting the biorenewable feed stream in a guard bed reactor in the presence of hydrogen to saturate olefins and remove metals to produce a contacted feed stream at a guard outlet temperature that is greater than the guard inlet temperature; heating the contacted feed stream in a charge heater to a hydrotreating inlet temperature that is greater than the guard outlet temperature; and hydrotreating the contacted feed stream in the presence of a hydrotreating hydrogen stream and a hydrotreating catalyst to deoxygenate the contacted feed stream to provide a hydrotreated stream. An embodiment of the invention is one, any or all of prior embodiments in this paragraph up through the second embodiment in this paragraph further comprising a guard outlet temperature of less than 343° C. (650° F.). An embodiment of the invention is one, any or all of prior embodiments in this paragraph up through the second embodiment in this paragraph wherein the biorenewable feed stream has a nitrogen concentration of greater than 500 wppm.

A third embodiment of the invention is a process for hydrotreating a biorenewable feedstock, the process comprising heating a biorenewable feed stream having a nitrogen concentration of greater than 500 wppm by heat exchange with a hydrotreated stream to a guard inlet temperature; contacting the biorenewable feed stream in a guard bed reactor in the presence of hydrogen to saturate olefins and remove metals to produce a contacted feed stream at a guard outlet temperature of less than 343° C. (650° F.) that is greater than the guard inlet temperature; heating the contacted feed stream in a charge heater to a hydrotreating inlet temperature that is greater than the guard outlet temperature; and hydrotreating the contacted feed stream in the presence of a hydrotreating hydrogen stream and a hydrotreating catalyst to deoxygenate the contacted feed stream to provide a hydrotreated stream. An embodiment of the invention is one, any or all of prior embodiments in this paragraph up through the third embodiment in this paragraph further comprising a guard outlet temperature of less than 304° C. (580° F.). An embodiment of the invention is one, any or all of prior embodiments in this paragraph up through the third embodiment in this paragraph further comprising separating the hydrotreated stream to provide a hydrotreated vapor stream and a hydrotreated liquid stream having less oxygen concentration than the biorenewable feed stream and hydroisomerizing the hydrotreated liquid stream over a hydroisomerization catalyst in the presence of a hydroisomerization hydrogen stream to provide a hydroisomerized stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydrotreating a biorenewable feedstock, the process comprising:
    heating a biorenewable feed stream by heat exchange;
    contacting the biorenewable feed stream with a guard bed catalyst in a guard bed reactor in the presence of hydrogen to saturate olefins and remove metals to produce a contacted biorenewable feed stream;
    heating all of said contacted biorenewable feed stream in a charge heater; and
    hydrotreating said contacted biorenewable feed stream in the presence of a hydrotreating hydrogen stream and a hydrotreating catalyst to deoxygenate said contacted biorenewable feed stream to provide the hydrotreated stream.

2. The process of claim 1 comprises heating the biorenewable feed stream by heat exchange with the hydrotreated stream.

3. The process of claim 2 further comprising measuring the temperature of the contacted biorenewable feed stream exiting the heat exchange, comparing it to a set point and bypassing a portion of the hydrotreated stream around the heat exchange with the contacted biorenewable feed stream to decrease the temperature of the contacted biorenewable feed stream exiting the heat exchange.

4. The process of claim 1 further comprising charging the guard bed reactor with the biorenewable feed stream at a guard inlet temperature, discharging the contacted biorenewable feed stream from the guard bed reactor at a guard outlet temperature that is greater than the guard inlet temperature and charging said contacted biorenewable feed stream to a hydrotreating reactor at a hydrotreating inlet temperature that is greater than the guard outlet temperature.

5. The process of claim 4 further comprising heating the biorenewable feed stream in a heater to the guard inlet temperature.

6. The process of claim 4 further comprising a guard outlet temperature of less than 343° C. (650° F.).

7. The process of claim 4 further comprising a guard outlet temperature of less than 304° C. (580° F.).

8. The process of claim 1 wherein the biorenewable feed stream has a nitrogen concentration of greater than 500 wppm.

9. The process of claim 1 further comprising separating the hydrotreated stream to provide a hydrotreated vapor stream and a hydrotreated liquid stream having less oxygen concentration than the biorenewable feed stream.

10. The process of claim 9 wherein separating the hydrotreated stream comprises separating the hydrotreated stream in a hydrotreating separator to provide a hot vapor stream and a hot liquid stream, separating a process liquid stream from said hot liquid stream, and passing the process liquid stream to an enhanced hot separator to separate the process liquid stream with the aid of a stripping gas into said hydrotreated vapor stream and said hydrotreated liquid stream.

11. The process of claim 10 further comprising taking a recycle liquid stream from said hot liquid stream and mixing said recycle liquid stream with said biorenewable feed stream.

12. The process of claim 10 further comprising hydroisomerizing the hydrotreated liquid stream over a hydroisomerization catalyst in the presence of a hydroisomerization hydrogen stream to provide a hydroisomerized stream.

13. The process of claim 12 further comprising separating the hydroisomerized stream to provide a vapor hydroisomerized stream and a liquid hydroisomerized stream.

14. The process of claim 13 further comprising stripping the process liquid stream with a stripping gas comprising the vapor hydroisomerized stream to provide the hydrotreated vapor stream and the hydrotreated liquid stream.

15. The process of claim 13 further comprising cooling the hot vapor stream, the hydrotreated vapor stream and the liquid hydroisomerized stream and feeding them to a cold separator which separates a cold liquid stream which is stripped to produce a green diesel stream.

16. The process of claim 15 further comprising a guard outlet temperature of less than 343° C. (650° F.).

17. The process of claim 15 wherein the biorenewable feed stream has a nitrogen concentration of greater than 500 wppm.

18. The process of claim 17 further comprising a guard outlet temperature of less than 304° C. (580° F.).

19. A process for hydrotreating a biorenewable feedstock, the process comprising:
heating a biorenewable feed stream by heat exchange with a hydrotreated stream to a guard inlet temperature;
contacting said biorenewable feed stream with a guard bed catalyst in a guard bed reactor in the presence of hydrogen to saturate olefins and remove metals to produce a contacted biorenewable feed stream at a guard outlet temperature that is greater than the guard inlet temperature;
heating all of said contacted biorenewable feed stream in a charge heater to a hydrotreating inlet temperature that is greater than the guard outlet temperature; and
hydrotreating said contacted biorenewable feed stream in the presence of a hydrotreating hydrogen stream and a hydrotreating catalyst to deoxygenate said contacted biorenewable feed stream to provide a hydrotreated stream.

20. A process for hydrotreating a biorenewable feedstock, the process comprising:
heating a biorenewable feed stream having a nitrogen concentration of greater than 500 wppm by heat exchange with a hydrotreated stream to a guard inlet temperature;
contacting said biorenewable feed stream with a guard bed catalyst in a guard bed reactor in the presence of hydrogen to saturate olefins and remove metals to produce a contacted biorenewable feed stream at a guard outlet temperature of less than 343° C. (650° F.) that is greater than the guard inlet temperature;
heating all of said contacted biorenewable feed stream in a charge heater to a hydrotreating inlet temperature that is greater than the guard outlet temperature; and
hydrotreating said contacted biorenewable feed stream in the presence of a hydrotreating hydrogen stream and a hydrotreating catalyst to deoxygenate said contacted biorenewable feed stream to provide a hydrotreated stream.

* * * * *